Sept. 13, 1932.　　　　J. WAHL　　　　1,877,706

AIR BAG COUPLING

Filed March 30, 1927

INVENTOR:
John Wahl,

By Attorneys,

Patented Sept. 13, 1932

1,877,706

UNITED STATES PATENT OFFICE

JOHN WAHL, OF ROSEDALE, NEW YORK, ASSIGNOR TO A. SCHRADER'S SON, INCORPORATED, OF BROOKLYN, NEW YORK, A CORPORATION OF NEW YORK

AIR BAG COUPLING

Application filed March 30, 1927. Serial No. 179,582.

This invention relates to air bag couplings and aims to provide certain improvements therein.

In the operation of vulcanizing pneumatic tire shoes and other articles, it is common practice to distend the tire shoe or the like within the mould by means of an internally arranged tube or so-called "bag" into which is interposed fluid under pressure, such as compressed air or water. Commonly the vulcanizing operation is performed in a cylindrical vulcanizer which contains a series of moulds stacked up and clamped together by a hydraulic ram which presses the entire series against the top or cover of the mould. The fluid such as water or air is distributed to the various moulds by a central tube made up of a series of so-called manifold couplings which are built up in the same manner as the moulds. Each of these couplings has leading from it a flexible pipe which at its free end is designed to be coupled to a valve attached to the air bag. It is very desirable that the individual couplings thus connected with the air bag shall be capable of quick and easy manipulation; shall provide a thoroughly leak-tight joint under heavy pressures and shall be of rugged and durable construction so that they are not easily broken or quickly worn.

The present invention relates particularly to such air bag couplings although, of course, it can be used in other connections if desired.

The various features of improvement included in the present invention will be hereinafter more fully described and claimed.

Referring to the drawing which illustrates one form of the invention,—

Figure 1:
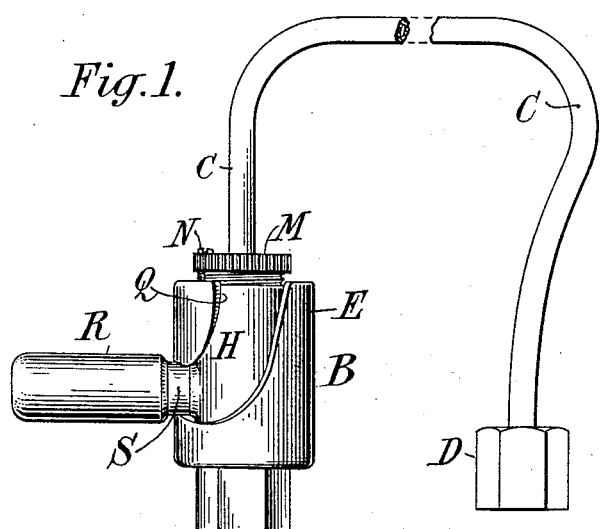
Figure 1 is an elevation of the coupling with its pipe, the coupling being shown as attached to the air bag valve.

Referring first to Fig. 1, let A indicate an air bag valve or any other part with which it is desired to make a connection, B the coupling proper, C a pipe or tube leading to the coupling, and D a screw-threaded union preferably swivelled which is adapted to be connected with the source of pressure as by screwing on a manifold coupling or the like used in the process of vulcanization.

The air bag valve A is provided with a suitable foot and has the usual clamping devices (not shown) by which it is connected with the air bag.

The coupling B comprises two mating parts, the one of which is connected with the air bag valve and the other of which is connected with the tube C. By preference the part which is connected with the valve is a receiving part E which comprises a sleeve, the lower end of which is screw-threaded at F and screws on the top of the valve A. This sleeve F is provided with a seating face such, for instance, as the nipple G which is best tapered or rounded where it contacts with the complemental seating face to be described. The nipple G may be formed as an integral part of the sleeve E, or it may be saparately formed as desired.

Figure 2:
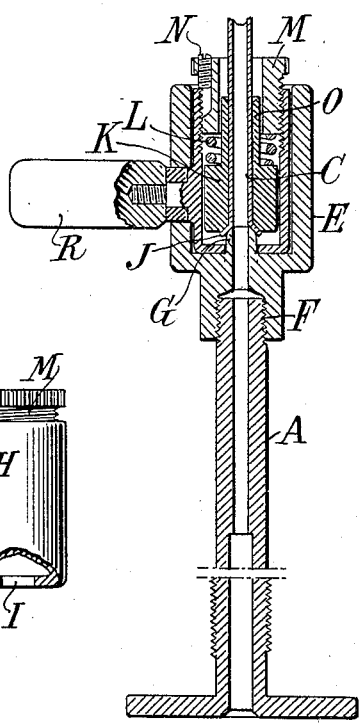
Fig. 2 is a diametrical section of the coupling and the valve.
Figure 3:
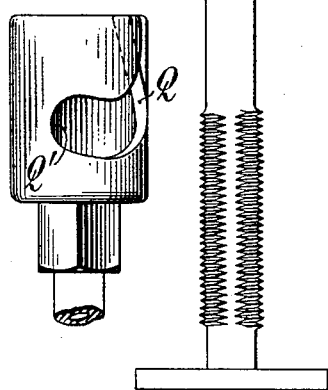
Fig. 3 is an elevation of a part of the coupling taken in a different angular position from that of Fig. 1.
Figure 5:
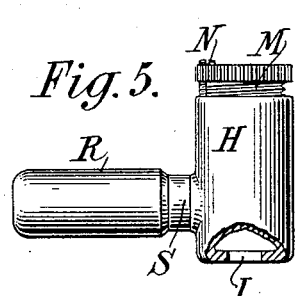
Fig. 5 is an elevation of the entering member of the coupling.
Figure 4:
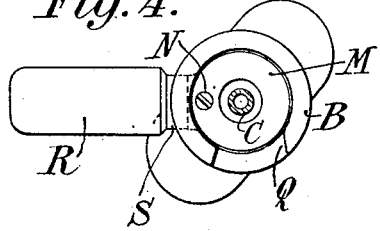
Fig. 4 is a plan.
Figure 6:
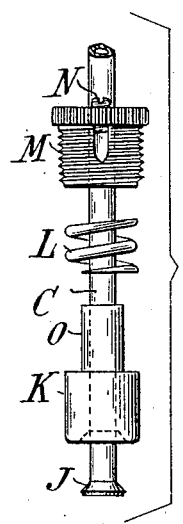
Fig. 6 is an elevation of the internal parts of the entering member.

The entering member H which is shown in elevation in Fig. 5 is cylindrical, preferably having at its bottom an aperture I through which the nipple G projects. It carries within it a spring-mounted seating face J which is complemental to and fits the nipple G. In the construction shown the seating face J is formed by flaring the end of the tube C which passes into the entering member, as best shown in Fig. 2. Fitting within the member H is a slidable collar K, the lower end of which is preferably tapered to conform to the seating face J and this collar in effect constitutes a support for the seating face. Above the collar is arranged a spring L which is compressed by a screw-threaded plug M screwing into the entering member, by the adjustment of which the compression of the spring L is varied. A set screw N is provided to hold the screw-threaded plug in its adjusted positions. Preferably the collar is provided with a neck O which serves to guide the spring, the neck entering the aperture in the screw-threaded plug.

Means are provided for coupling the parts together, and for causing an engagement of the seating faces under spring pressure. This may be variously accomplished, but in the construction shown I have illustrated a cam groove Q which is formed in the receiving member E and which is designed to be engaged by an arm R fixed to the member H which enters the cam groove in an axial direction and when turned serves to force the two coupling parts into engagement so that the seating face G presses the seating face J and collar K upwardly against the compression of the spring. Preferably the arm is provided with a roller S so as to minimize the friction between the arm and cam groove.

In the use of vulcanizing apparatus to which the present invention is particularly directed the workman in charge stacks up the various moulds and manifold couplings as the ram is slowly lowered, and as each manifold coupling is inserted, its corresponding air bag coupling is connected with the air bag valve. The reverse operation takes place when the vulcanizer is unloaded. The attendant during the loading and unloading operations has to work rapidly in a position which is over the top of the vulcanizing cylinder and the heat conditions are very onerous, hence to utilize the vulcanizer to the fullest extent the operations of loading and unloading are speeded up, with the result that the air bag couplings are connected and disconnected many times during the working day. It is hence important that the air bag coupling shall be capable of rapid operation, and that the force required for coupling and uncoupling shall be reduced to the minimum. As the air pressures are high, reaching to 300 or 400 pounds, the coupling members withstand severe pressure, and consequently the spring loading is heavy. The present invention permits these operations to proceed with the least possible strain upon the operator, since the camming of the two parts together enables the coupling to be connected or disconnected with the minimum of effort. The parts are self-adjusting and will operate for considerable periods without varying the position of the screw-threaded plug but if the spring weakens, it can be restored by screwing the plug further in. The cam Q is best formed with a slight rise Q' which serves to lock the parts in position without unduly lessening the compression of the spring.

While I have shown and described one form of the invention, it will be understood that I do not wish to be limited thereto, since various changes may be made therein without departing from the spirit of the invention. The invention is also susceptible of use in other connections than that shown and described.

What I claim is:

1. A coupling of the character described, comprising an entered member having a seating face in its bottom wall, an entering member having a seating face for cooperative engagement with the first mentioned seating face, a spring for said last named seating face for urging it toward the entering end of the entering member, a cam groove formed in the entered member, and an arm carried by the entering member movable in the cam groove to force the seating faces together.

2. A coupling of the character described, comprising a cylindrical member adapted to be connected with a valve and having an open end, a seating face comprising a nipple carried thereby, a cam groove formed in the wall of said member, a second member for entering the first member and formed as a cylindrical body having a movable seating face adapted to coact with said nipple, a collar connected with said seating face, a spring for urging said collar in a direction to bring the seating faces together, a screw-threaded adjusting plug for said spring, and an arm adapted to enter said cam groove to force said seating faces in said members together.

3. A coupling of the character described, comprising an entering member and an entered member having cooperating seating faces, one of said seating faces being formed on the flared end of a tube carried by one of the members and movable axially with relation thereto, spring means normally urging said tube end toward the seating face of its carrying member and means for coupling the members together to bring the cooperating seating faces thereof into engagement.

4. A coupling of the character described, comprising an entered member and an entering member, an axially movable tube carried by one of said members, the end of said tube being flared to provide a seating face, a slidable collar support for said flared seating face mounted upon and movable relatively to said tube, a spring for yieldingly holding said collar against said flared tube end, the other of said members having a seating face which is complemental to the flared seating face at the end of the tube, and means for forcing said seating faces together against the compression of the spring when the members are being coupled together.

In witness whereof, I have hereunto signed my name.

JOHN WAHL.